(No Model.)
H. BARBER.
SPRING LINK.
No. 535,156. Patented Mar. 5, 1895.
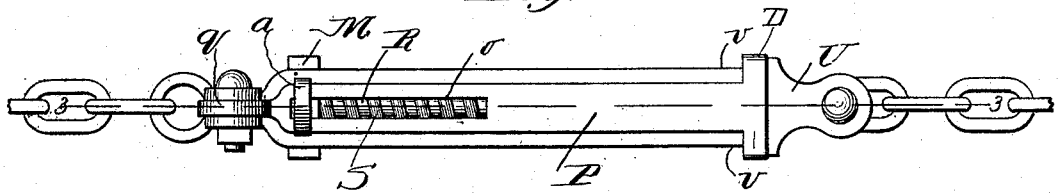
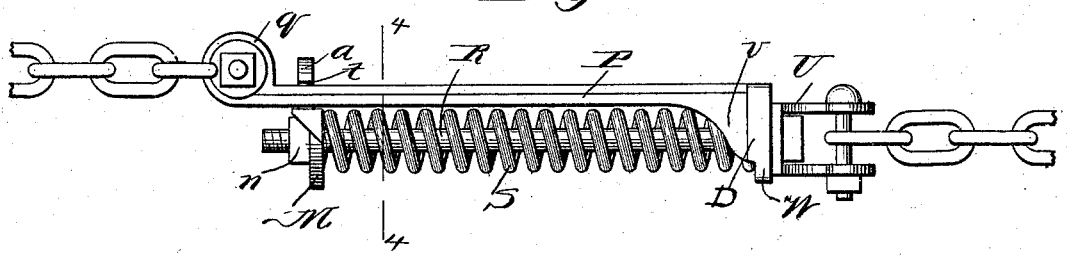
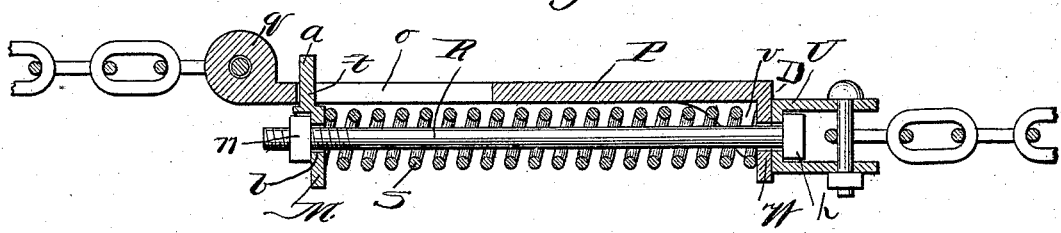
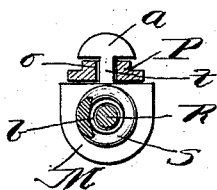
Witnesses.
Fredk. H. Mills.
Gussie E. Mueller.
Inventor:
Hiram Barber

UNITED STATES PATENT OFFICE.

HIRAM BARBER, OF CHICAGO, ILLINOIS.

SPRING-LINK.

SPECIFICATION forming part of Letters Patent No. 535,156, dated March 5, 1895.

Application filed August 1, 1892. Serial No. 441,803. (No model.)

*To all whom it may concern:*

Be it known that I, HIRAM BARBER, a citizen of the United States, and a resident of Chicago, in the county of Cook and State of Illinois, have invented certain new and useful Improvements in Spring or Elastic Links, of which the following is a specification.

My invention relates to certain improvements in spring or elastic links or couplings employed in draft equalizers or machinery, wherein it is desired to lessen or obviate the shock incident to starting.

It consists in certain details of construction and arrangement of parts hereinafter fully set forth in the accompanying specification, illustrated in the drawings, and pointed out in the claims.

Like letters of reference in the drawings indicate like parts.

Of the drawings herewith submitted, Figure 1: is a plan view of my spring link. Fig. 2: is a side elevation of my spring link. Fig. 3: is a sectional view of my spring link on the line 3—3. Fig. 4: is a view in cross section of my spring link on the line 4—4.

In the construction of spring links hitherto, various devices have been made use of.

One method has been to compress a coil spring within a hollow cylinder or barrel; one end of which is covered with a perforated cap. A rod, (provided with a suitable head,) passing longitudinally through the spring, which is inclosed within the cylinder, also extends through the perforated cap, thus affording a point of attachment. By securing a chain to the open end of the cylinder and another to the rod extending through the perforated cap, the spring may be compressed by draft in opposite directions; thus affording a spring or yielding link. This method has, however, been found cumbersome and unsatisfactory. To obviate this difficulty, the cylinder has been entirely dispensed with in other devices. In one case the wire of which the spring is composed, is formed at each end thereof into a point of attachment and the elastic or yielding link is thus obtained by means of the extension of the spring instead of its compression. Again the cylinder is dispensed with by means of parallel rods passing through the spring longitudinally with solid blocks attached to the ends thereof, between which blocks the spring is compressed and thus giving the yielding or spring link. Neither of these methods has proven quite satisfactory. By my device herein described I have sought to overcome the difficulties hitherto encountered in the effort to dispense with the hollow cylinder.

In the construction of my spring link I make use of the draw-plate "P," the clevis "U," the rod "R," coil spring "S" and plate "M" and burr $n$. The draw-plate "P" is provided with a hood formed by the wall "W," and the brackets "v. v." for the reception of one end of the coil spring "S." The rear wall "W" of the draw-plate "P" is perforated for the passage of the rod "R." The draw-plate "P" is also provided with the longitudinal slot "o" and the lug "q." The slot "o" is designed to afford free movement to the stem "t" of the plate "M," while the lug "q" is designed to furnish a point of attachment. The plate "M" is provided with the aperture "b" for the passage of the rod "R" and also with the stem "t," having the head "a" made integral therewith. The length of the head "a" exceeds the width of the slot "o" while the thickness thereof is less than the width of the slot "o." The stem "t" is made to fit the slot "o" and have free movement therein. When therefore the head "a" is inserted longitudinally into the slot "o" it passes readily through the plate "P." The plate "M" may then be turned and the head "a" brought longitudinally across the outer surface of the draw-plate "P." The plate "M" is thus held firmly in position, while the slot "o" permits freedom of backward and forward motion to the same. When in position, the coil spring S is placed against the inner surface of the draw-plate "P" with one end against the inner face of the wall "W" and the other against the inner face of the plate "M," while the rod "R" extends through the wall "W," the coil spring "S" (longitudinally) and the plate "M," one end thereof being provided with a head and the other secured by the nut "$n$." It will be seen that with a chain attached to the lug "q" and another to the clevis "U," the coil spring "S" may be readily compressed by draft upon the chains in opposite directions. With the compression of the coil spring "S" and the free movement of the stem "t" in the slot "o," the plate "M" is drawn toward the wall "W" and thus a yielding or spring link is secured.

The utility of an elastic or spring link is a matter of common observation. Devices of this character are in use everywhere to take off the jar or strain to which draft animals and machinery are subjected. A cheap, durable and satisfactory elastic or spring link is a great desideratum. In my spring link as herein set forth, I have sought to combine all these qualities.

Having thus described my spring link, its object, purpose, method of construction, and mode of operation, what I claim as novel and as of my invention, for which I seek Letters Patent, is the following, viz:

1. In a spring or elastic link, the combination of the longitudinally slotted draw plate P provided with the hood D on its under side at one end, and the upstanding lug $q$ on its upper side at the opposite end; the rod R having the head $a$ and burr $n$ at opposite ends; the coil spring S, and the plate M, arranged substantially as and for the purpose described.

2. In a spring or elastic link, the draw plate P, the rod R beneath the draw plate and projecting through its end wall; the coil spring S surrounding the rod; the movable plate M connecting the rod with the draw plate, and the clevis U secured to the outer end of the rod, all arranged and combined substantially as and for the purpose described.

3. In a spring or elastic link, the combination of a longitudinally slotted plate; a necked plate adapted to engage with and move within said slot; a hood made integral with or secured to the outer end of said longitudinally slotted plate; a rod provided with head, and burr, at opposite ends projecting through the end wall of the hood, and through the movable plate; a coiled spring surrounding the rod and interposed between the hood and movable plate, and a clevis connecting with the outer end of the rod, substantially as and for the purpose set forth.

HIRAM BARBER.

Witnesses:
J. F. CARMICHAEL,
JOHN HONKOMP.